US006887914B2

(12) United States Patent
Czaplicki et al.

(10) Patent No.: US 6,887,914 B2
(45) Date of Patent: May 3, 2005

(54) STRUCTURAL HOT MELT MATERIAL AND METHODS

(75) Inventors: Michael J. Czaplicki, Rochester, MI (US); David J. Kosal, Richmond, MI (US); Jeanne Antrim, Lake Orion, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 10/234,902

(22) Filed: Sep. 4, 2002

(65) Prior Publication Data

US 2003/0069335 A1 Apr. 10, 2003

Related U.S. Application Data

(60) Provisional application No. 60/318,183, filed on Sep. 7, 2001.

(51) Int. Cl.[7] .................................................. C08J 9/10
(52) U.S. Cl. ....................... 521/178; 156/330; 156/547; 156/548; 428/196; 428/304.4; 428/305.5; 428/308.4; 428/322.7
(58) Field of Search ................................. 521/178, 135, 521/54; 156/330, 547, 548; 428/196, 234.4, 305.5, 308.4, 322.7

(56) References Cited

U.S. PATENT DOCUMENTS

| | | | | |
|---|---|---|---|---|
| 4,427,481 A | * | 1/1984 | Smith et al. | |
| 4,538,380 A | * | 9/1985 | Colliander | |
| 4,693,775 A | * | 9/1987 | Harrison et al. | |
| 4,724,243 A | * | 2/1988 | Harrison | |
| 4,749,434 A | * | 6/1988 | Harrison | |
| 4,769,166 A | * | 9/1988 | Harrison | |
| 4,898,630 A | * | 2/1990 | Kitoh et al. | |
| 4,922,596 A | * | 5/1990 | Wycech | |
| 4,923,902 A | * | 5/1990 | Wycech | |
| 4,978,562 A | * | 12/1990 | Wycech | |
| 4,995,545 A | * | 2/1991 | Wycech | |
| 5,124,186 A | * | 6/1992 | Wycech | |
| 5,266,133 A | | 11/1993 | Hanley et al. | |
| 5,274,006 A | * | 12/1993 | Kagoshima et al. | |
| 5,470,886 A | * | 11/1995 | Makhlouf et al. | |
| 5,475,039 A | | 12/1995 | Butikofer | |
| 5,575,526 A | | 11/1996 | Wycech | |
| 5,648,401 A | * | 7/1997 | Czaplicki et al. | |
| 5,712,317 A | * | 1/1998 | Makhlouf et al. | |

(Continued)

FOREIGN PATENT DOCUMENTS

| | | | |
|---|---|---|---|
| EP | 0 442 178 A1 | * | 8/1991 |
| JP | 4059820 | * | 2/1992 |
| WO | WO 95/33785 | | 12/1995 |
| WO | WO 97/02967 | | 1/1997 |
| WO | WO 97/12929 | * | 4/1997 |
| WO | WO 97/19124 | * | 5/1997 |
| WO | WO 98/52997 | * | 11/1998 |
| WO | WO 99/02578 | * | 1/1999 |
| WO | WO 00/12571 | | 3/2000 |
| WO | WO 00/12595 | | 3/2000 |
| WO | WO 00/13876 | | 3/2000 |
| WO | WO 00/20483 | | 4/2000 |
| WO | WO 00/37242 | | 6/2000 |
| WO | WO 00/37554 | | 6/2000 |
| WO | WO 00/39232 | | 7/2000 |
| WO | WO 00/40629 | | 7/2000 |
| WO | WO 00/52086 | | 9/2000 |
| WO | WO 01/34453 | * | 5/2001 |
| WO | WO 01/41950 | * | 6/2001 |
| WO | WO 01/57130 | * | 8/2001 |
| WO | WO 01/58741 | | 8/2001 |
| WO | WO 01/88033 | * | 11/2001 |
| WO | WO 02/26551 | | 4/2002 |
| WO | WO 03/072677 | | 9/2003 |
| WO | WO 03/078163 | | 9/2003 |

OTHER PUBLICATIONS

"The Epoxy Book", A System Three Resins Publication, pp. 1–41, System Three Resins, Inc., Seattle, Washington.
"Epoxy Resins", Second Edition Encyclopedia of Polymer Science and Engineering, vol. 6, pp. 322–382, 1985.
U.S. Appl. No. 09/939,245 filed Aug. 24, 2001.
U.S. Appl. No. 09/923,138 filed Aug. 6, 2001.
U.S. Appl. No. 09/858,939 filed May 16, 2001.
U.S. Appl. No. 09/502,686 filed Feb. 11, 2000.
U.S. Appl. No. 09/459,756 filed Dec. 10, 1999.
U.S. Appl. No. 09/676,335 filed Sep. 29, 2000.
U.S. Appl. No. 09/676,725 filed Sep. 29, 2000.
U.S. Appl. No. 09/747,252 filed May 2, 2001.
U.S. Appl. No. 10/233,919 filed Sep. 3, 2002.
U.S. Appl. No. 10/212,524 filed Aug. 5, 2002.
U.S. Appl. No. 10/119,446 filed Apr. 10, 2002.
U.S. Appl. No. 60/351,950 filed Jan. 25, 2002.
U.S. Appl. No. 60/369,001 filed Apr. 1, 2002.
International Search Report dated Nov. 12, 2002.

Primary Examiner—Morton Foelak
(74) Attorney, Agent, or Firm—Dobrusin & Thennisch PC

(57) ABSTRACT

The present invention relates to a material, method, and application for reinforcement of structural members, especially joints such as a hem flange joint of an automobile. The method and material of the present invention comprises of combining, in parts by weight: less than about twenty percent (<20%) ethylene copolymer, less than about forty percent (<40%) epoxy, less than about thirty percent (<45%) epoxy-based resin, less than about two percent (<2%) blowing agent and from about one percent (1%) to about five percent (5%) curing agent (and optionally add any of the following components: less than about two percent (<2%) curing agent accelerator, from about twenty-five percent (25%) to fifty-five percent (55%) filler, and less than about one percent (<1%) of coloring agent). The application of the present invention comprises of: (1) providing a structural member having two substrates forming a space to be joined; (2) placing the material of the present invention in proximity of the space to be joined; (3) exposing the material to a heat source causing it to flow, fill, and cure in the defined area or space to be joined.

25 Claims, 1 Drawing Sheet

U.S. PATENT DOCUMENTS

| | | | |
|---|---|---|---|
| 5,755,486 | A | 5/1998 | Wycech |
| 5,783,272 | A * | 7/1998 | Wong |
| 5,783,298 | A | 7/1998 | Herring, Jr. et al. |
| 5,884,960 | A * | 3/1999 | Wycech |
| 5,894,071 | A | 4/1999 | Merz et al. |
| 5,932,680 | A * | 8/1999 | Heider |
| 5,948,508 | A * | 9/1999 | Pastore et al. |
| 5,964,979 | A * | 10/1999 | George et al. |
| 5,985,435 | A | 11/1999 | Czaplicki et al. |
| 5,994,423 | A | 11/1999 | Born et al. |
| 6,004,425 | A | 12/1999 | Born et al. |
| 6,030,701 | A | 2/2000 | Johnson et al. |
| 6,040,350 | A | 3/2000 | Fukui |
| 6,057,382 | A | 5/2000 | Karim et al. |
| 6,077,884 | A | 6/2000 | Hess et al. |
| 6,096,791 | A | 8/2000 | Born et al. |
| 6,103,784 | A | 8/2000 | Hilborn et al. |
| 6,133,335 | A | 10/2000 | Mahoney et al. |
| 6,136,398 | A | 10/2000 | Willett et al. |
| 6,136,944 | A | 10/2000 | Stewart et al. |
| 6,153,302 | A | 11/2000 | Karim et al. |
| 6,162,504 | A | 12/2000 | Hubert et al. |
| 6,174,932 | B1 | 1/2001 | Pachl et al. |
| 6,218,442 | B1 | 4/2001 | Hilborn et al. |
| 6,228,449 | B1 | 5/2001 | Meyer |
| 6,232,433 | B1 | 5/2001 | Narayan |
| 6,235,842 | B1 | 5/2001 | Kuwano et al. |
| 6,263,635 | B1 | 7/2001 | Czaplicki |
| 6,277,898 | B1 | 8/2001 | Pachl et al. |
| 6,287,669 | B1 | 9/2001 | George et al. |
| 6,303,672 | B1 | 10/2001 | Papalos et al. |
| 6,312,668 | B2 | 11/2001 | Mitra et al. |
| 6,319,964 | B1 | 11/2001 | Blank et al. |
| 6,348,513 | B1 | 2/2002 | Hilborn et al. |
| 6,350,791 | B1 | 2/2002 | Feichtmeier et al. |
| 6,376,564 | B1 | 4/2002 | Harrison |
| 6,419,305 | B1 | 7/2002 | Larsen |
| 6,429,244 | B1 | 8/2002 | Rinka et al. |
| 6,432,475 | B1 | 8/2002 | Yamamoto et al. |
| 6,437,055 | B1 | 8/2002 | Moriarity et al. |
| 6,440,257 | B1 | 8/2002 | Zhou et al. |
| 6,441,075 | B2 | 8/2002 | Hirata et al. |
| 6,441,081 | B1 | 8/2002 | Sadatoshi et al. |
| H2047 | H | 9/2002 | Harrison et al. |
| 6,444,149 | B1 | 9/2002 | Valentinsson |
| 6,444,713 | B1 | 9/2002 | Pachl et al. |
| 6,448,338 | B1 | 9/2002 | Born et al. |
| 6,451,231 | B1 | 9/2002 | Harrison et al. |
| 6,451,876 | B1 | 9/2002 | Koshy |
| 6,455,146 | B1 | 9/2002 | Fitzgerald |
| 6,455,476 | B1 | 9/2002 | Imai et al. |
| 6,467,834 | B1 | 10/2002 | Barz et al. |
| 6,471,285 | B1 | 10/2002 | Czaplicki et al. |
| 6,479,560 | B2 | 11/2002 | Freitag et al. |
| 6,482,486 | B1 | 11/2002 | Czaplicki et al. |
| 6,486,256 | B1 | 11/2002 | Tarbutton et al. |
| 6,506,494 | B2 | 1/2003 | Brandys et al. |
| 6,561,571 | B1 | 5/2003 | Brennecke |
| 6,573,309 | B1 | 6/2003 | Reitenbach et al. |
| 6,620,501 | B1 | 9/2003 | Kassa et al. |
| 6,682,818 | B2 | 1/2004 | Czaplicki et al. |
| 2002/0009582 | A1 | 1/2002 | Golden |
| 2002/0120064 | A1 | 8/2002 | Khandpur et al. |
| 2002/0123575 | A1 | 9/2002 | Kato et al. |
| 2002/0136891 | A1 | 9/2002 | Khandpur et al. |
| 2002/0137808 | A1 | 9/2002 | Gehlsen et al. |
| 2003/0187129 | A1 | 10/2003 | Bell et al. |
| 2004/0079478 | A1 | 4/2004 | Merz |

* cited by examiner

STRUCTURAL HOT MELT MATERIAL AND METHODS

FIELD OF THE INVENTION

The present invention relates generally to epoxy-based structural materials that are used for reinforcement of structural members, especially joints, flanges, and other areas of transportation vehicles or other goods that could benefit from enhanced structural rigidity and reinforcement. More particularly, the present invention relates to an extruded or injection molded, non-tacky, epoxy-based structural material exhibiting improved mechanical properties (e.g., higher lap shear and higher T-Peel performance compared to products and methods found in the prior art) that can be dropped or otherwise disposed into any applicable joint, flange, or other targeted portion of the vehicle to impart structural rigidity and integrity to the selected joint or portion of the vehicle. The present invention further comprises a method or process whereby heat, emanating from the e-coat process, paint ovens, or other source of heat energy found in automotive manufacturing facility, allows the material to adhere to at least a portion of a selected substrate for curing in place to impart post-cure structural rigidity.

BACKGROUND OF THE INVENTION

Traditional hot melt materials that are used in the art for reinforcement of structural members, such as hem flange joints, have several limitations. Generally speaking, the prior art materials require adhesion enhancement, mechanical fasteners, and/or pressurization for placement in the desired location. These prior art methods also may initiate re-melt flow upon exposure to heat, either unexpectedly or inadvertently, thereby reducing their ability to provide structural reinforcement and, more importantly, corrosion protection to the structural members at the desired location at a desired time and place during the manufacturing process. Additionally, standard application of traditional hot melt materials may expose uncoated portions of structural members to corrosion and reduce their structural integrity. For example, the standard application generally requires the traditional hot melt material to be dispensed into the radius of the outer panel of a hem flange joint. Thereafter, the inner panel of the hem flange joint is inserted or otherwise placed into contact in the area of the outer panel. The two panels are then crimped together and pass through a gel oven to partially cure the traditional hot melt material so that it does not wash off during the cleaning and electrodeposition coating processes (e-coat). These methods and traditional hot melt material found in the prior art is at least partially cured while passing through the electrodeposition coating process and the paint ovens typically encountered in the manufacturing environment. Generally speaking, the current materials, methods, and processes found in the prior art incorporate the use of a hem flange adhesive (i.e. the material that is squeezed out or otherwise expelled from the selected flange) and a wax stick material that is disposed within or coats the interior of the selected flange.

However, these prior art materials and processes have a number of drawbacks and deficiencies which can ultimately diminish their efficiency and performance in a manufacturing facility. For example, during standard application before the electrodeposition coating process, metal shavings, oil and other types of contamination can be trapped in the hem flange joint or some other targeted portion of a transportation vehicle or joint to be reinforced, which can cause electrodeposition coating not to adhere to the metal surface of the hem flange joint very well, thereby producing a site for corrosion initiation. Moreover, the crimping process found in the prior art may serve to inhibit the flow or disposition of the selected material (including e-coat) within the joint or flange, since the now crimped panel can function as a barrier to proper flow of the materials, thereby leading to corrosion over time. Corrosion can also occur when too much standard hot melt material is dispensed into the outer panel of hem flange joint. The excess standard hot melt material is expelled during the crimping process and may flow onto the hem flange panels and lead to unwanted hem flange adhesive and wax stick materials being deposited into the flange and surrounding areas which can impede melt and sealing and lead to corrosion over the life of the vehicle. This excess standard hot melt material is difficult to clean, thereby causing maintenance issues to arise in the manufacturing facility. It can also result in inadequate adherence between the electrodeposition coating and the hem flange panels, thereby producing sites for corrosion initiation. Accordingly, both an over abundance and a lack of proper placement of sufficient amounts of hot melt material within the selected joint can interfere with the e-coat process and lead to the development of corrosion areas within the vehicle over time. Another limitation of the techniques found in the prior art is that the amount of traditional hot melt material being dispensed into the outer panel of hem flange joint may be inconsistent and non-uniform. As discussed above, when there is too much traditional hot melt material dispensed, corrosion may occur as a result of poor e-coat deposition. Likewise, if an insufficient amount of traditional hot melt material is dispensed into a flange or joint, corrosion is also likely to occur since a gap or gaps of dispersed material may develop during e-coat deposition resulting in uncoated metal in the hem flange.

Accordingly, the present application overcomes the drawbacks and disadvantages found in the prior art materials and processes by providing a single product structural hot melt material which satisfies the need in industry and manufacturing operations for a structural material that can be directly applied to a particular application without mechanical fasteners/or pressurization in order to reinforce a chosen structural member, joint, or flange. There is also a need for an improved structural material that provides better mechanical performance and is a thermoset hot melt, which does not flow upon re-heating. Additionally, there is a need for an improved structural material that can be inserted, applied, or otherwise disposed into contact with portions of a land, marine, or aerospace vehicle in a manner that prevents corrosion. By providing a structural material with better mechanical properties and desirable processing attributes, the present invention addresses and overcomes the shortcomings found in the prior art.

SUMMARY OF THE INVENTION

The present invention relates to a material, method, and application for structural reinforcement, preferably of joints such as hem flange joints, tailgates, lift gates, rear gates, and other means or areas of ingress and egress used in automotive vehicles, that exhibit improved mechanical properties and can be applied to selected and targeted portions of a transportation, aerospace, or marine vehicle without fastening means or pressurization. In one embodiment, the present invention provides a material for structural reinforcement, which comprises, in parts by weight, less than about twenty percent (<20%) ethylene copolymer, less than about forty percent (<40%) epoxy, less than about thirty percent (<30%)

epoxy-based resin (such as Epoxy/CTBN adduct), less than about two percent (<2%) blowing agent and from about one percent (1%) to about five percent (5%) of a curing agent. The material may also optionally include any of the following components: less than about two percent (<2%) curing agent accelerator or initiator, from about twenty-five percent (25%) to fifty-five percent (55%) filler, and less than about one percent (<1%) of coloring agent.

In another embodiment, the present invention provides a method for forming a material for structural reinforcement comprising the combination, in parts by weight, less than about twenty percent (<20%) ethylene copolymer, less than about forty percent (<40%) epoxy, less than about thirty percent (<30%) epoxy-based resin, less than about two percent (<2%) blowing agent and from about one percent (1%) to about five percent (5%) curing agent (and optionally includes any of the following components: less than about two percent (<2%) curing agent accelerator, from about twenty-five percent (25%) to fifty-five percent (55%) filler, and less than about one percent (<1%) of coloring agent).

In yet another embodiment, the present invention provides a method of reinforcing structural members, particularly joints such as a hem flange joint in an automotive vehicle, which in a preferred embodiment, can serve to reduce and/or eliminate the step of pre-crimping the selected panels during the manufacturing process. The method comprises of: providing a structural member having two substrates forming a space to be joined; placing a structural material comprising, in parts by weight, less than about twenty percent (<20%) ethylene copolymer, less than about forty percent (<40%) epoxy, less than about thirty percent (<30%) epoxy-based resin, less than about two percent (<2%) blowing agent and from about one percent (1%) to about five percent (5%) curing agent, (and optionally includes any of the following components: less than about two percent (<2%) curing agent accelerator, from about twenty-five percent (25%) to fifty-five percent (55%) filler, and less than about one percent (<1%) of coloring agent) in proximity of the space to be joined or otherwise prepared for application; exposing the structural material to a heat or other energy source causing the structural material to flow, fill, and cure in the defined area or space to be joined thereby providing post-cure structural integrity and rigidity to the selected area or space of the land, marine, or aerospace vehicle. The method disclosed in the present invention provides an improved placement or disposition of hot-melt material throughout the selected flange or joint of automotive vehicles whereby the material is dispersed in a uniform manner and works in conjunction with the e-coat process to inhibit corrosion.

DETAILED DESCRIPTION OF THE PREFERRED EMBODIMENTS

Figure 1:
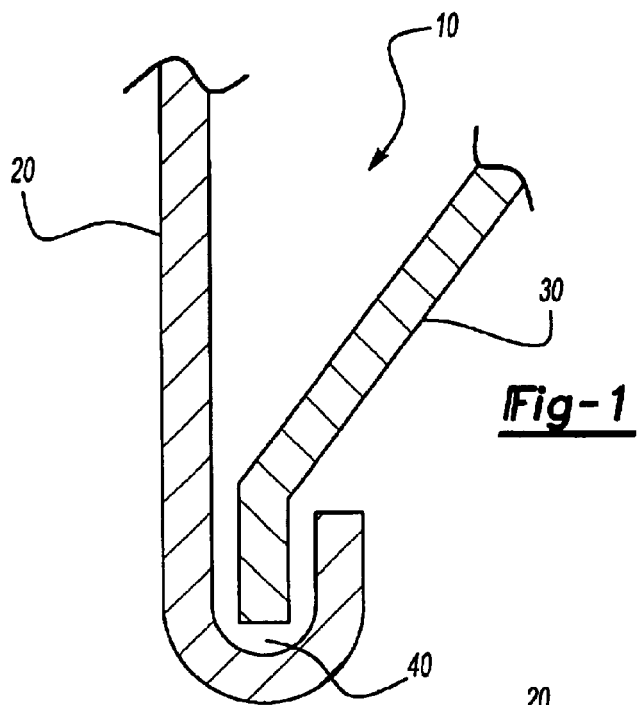
FIG. 1 shows a structural member having two members forming a space to be joined (e.g., a hem flange joint of an automobile).

As used herein, all concentrations shall be expressed as percentages by weight unless otherwise specified.

The Material

In a preferred embodiment, the material of the present invention includes less than about twenty percent (<20%) ethylene copolymer including, without limitation, ethylene-vinyl acetate (EVA) copolymer, ethylene vinyl acrylate, ethylene-methyl acrylate (EMA) copolymer, ethylene-butyl acrylate (EBA) copolymer, EMA/GMA, ethylene/α-olefin, and ethylene-ethyl acrylate (EEA). It is further preferred, but not required, that the ethylene copolymer is in a solid state or semi-solid state. The material of the present invention may also include less than about forty percent (<40%) epoxy, preferably in a solid state, such as bisphenol A, bisphenol F, novolac, modified urethane, or the like, including an adduct of such epoxy, such as a rubber adduct. Further, material disclosed in the present invention may optionally include less than about forty-five percent (<45%) of an epoxy-based resin, preferably about two-thirds in a solid state, and the remainder in a liquid state or any combination thereof. Although it is preferred that the solid epoxy-based resin is a bisphenol A epoxy resin or an adduct thereof such as a rubber adduct, it may also be selected to be a bisphenol F resin or the like, while the liquid epoxy-based resin may comprise an epoxy phenol novolac resin, an epoxy curosol novalac resin, or the like. Further material may also include less than about two percent (<2%) of a blowing agent, preferably azodiacarbonamide, p,p-Oxybisbenzene sulfonyl hydrazide, p-Toluene sulfonyl hydrazide, and the use of expancel as more fully described in commonly-assigned U.S. patent application Ser. No. 09/847,252 for a Two Component (Epoxy/Amine) Structural Foam-In-Place Material filed May 2, 2001, U.S. Provisional Patent Application Ser. No. 60/324,495 for Creation Of Epoxy-Based Foam-In-Place Material using Encapsulated Metal Carbonate filed Sep. 24, 2001, and U.S. Provisional Patent Application Ser. No. 60/324,486 for Homopolymerized Epoxy-Based Foam-In-Place Material filed Sep. 24, 2001, all of which are hereby expressly incorporated by reference. Finally, the material includes from about one percent (1%) to about five percent (5%) curing agent such as dicyanamide, imidazoles, or the like. The material may optionally include a curing agent accelerator such as any modified ureas. Furthermore, the material may optionally include additive components such as fillers and coloring agents. It is preferred that the filler component of the material is about twenty-five percent (25%) to about fifty-five percent (55%) and any coloring agent used is less than one percent (<1%). Suitable fillers include, without limitation, calcium carbonate, mica, montmorillinite, and others as described in commonly assigned U.S. Pat. No. 5,648,401, which is hereby incorporated by reference. In this embodiment of the present invention, a thixotropic filler may also be used to enhance processing, flow, and/or control attributes of the material. Examples of such a thixotropic filler include aramide pulp (sold under the trade name Kevlar 1F543), nanoclay (sold under the trade name Garamite 1958, fumed silica, or the like). Any art disclosed coloring agents can be used. An example of such coloring agent is iron oxide or other metal oxide.

It is contemplated that the material disclosed in the present invention may comprise a thermoset hot melt, which will not flow upon re-heating. The material also offers improved mechanical performance over traditional hot melt materials, including at least about fifty percent (50%) higher lap shear and at least about fifty percent (50%) higher T-Peel performance.

In a highly preferred embodiment and formulation, the material of the present invention is comprised of the following components:

| Component | Chemical Name | Product Name | Supplier Name | Percentage by Weight |
| --- | --- | --- | --- | --- |
| Ethylene copolymer | Ethylene-methyl acrylate copolymer | Optema TC 120 | Exxon Mobil Chemical | 3.81% |
| Epoxy | Bisphenol A epoxy - CTBN rubber adduct | RK8-4 | CVC Speciality Chemicals | 23.49% |
| Solid epoxy resin | Bisphenol A epoxy resin | Lapox P3 | Royce International | 17.81% |
| Solid epoxy resin | Bisphenol A epoxy resin | Lapox-P4 | Royce International | 6.43% |
| Liquid epoxy resin | Epoxy phenol novoiac resin | Epalloy 8250 | CVC Speciality Chemicals | 0.26% |
| Blowing agent | Azodicarbonamide | Celogen 754A | Uniroyal | 0.12% |
| Curing agent accelerator | Methylene diphenyl bis (dimethyl urea) | Omicure 52 | CVC Speciality Chemicals | 0.50% |
| Curing agent | Cyanoguanidine | Amicure CG | Air Products | 1.55% |
| Filler | Calcium Carbonate | GPR 270 | Global Stone PenRoc, Inc. | 45.84 |
| Coloring agent | Metal oxide, pigment yellow 42 | Akrochem E-6892 Yellow | Akrochem Corp. | 0.19% |

The Method

In the method of the present invention, the above-discussed components (e.g., in parts by weight, less than about twenty percent (<20%) ethylene copolymer, less than about forty percent (<40%) epoxy, less than about thirty percent (<30%) epoxy-based resin, less than about two percent (<2%) blowing agent and from about one percent (1%) to about five percent (5%) curing agent (and optionally add any of the following components: less than about two percent (<2%) curing agent accelerator, from about twenty-five percent (25%) to fifty-five percent (55%) filler, and less than about one percent (<1%) of coloring agent.)) are combined together to form the material of the present invention. The components can be combined (e.g., mixed) either statically or dynamically using suitable equipment, methods, and tools found in the art such as twin screw extruders, single screw extruders, double arm mixers, intensive mixers, or the like. It is contemplated that the newly-formed material may cure at a variety of temperatures (i.e., with or without external heat), which may typically be encountered in an automotive manufacturing environment.

The Application

The present invention also provides a method of reinforcing structural members, especially joints such as a hem flange joint in an automobile and other joints, hinges, or portions of an automotive vehicle, which may be subject to corrosion from the outside elements using the above-described material or from inconsistent and non-uniform disposition of the material in the selected join or hinge, which can inhibit the functioning of the e-coat process. Referring to FIG. 1, the method comprises the steps of providing a structural member 10 having two substrates 20, 30 forming a space to be joined 40. It is contemplated that the substrates 20, 30 utilized in the present invention could be a traditional metal flange or joint, such as an automotive hem flange or other automotive joint, or the selected substrates 20, 30 could be of a non-metal composite or polymeric material incorporated into automotive design, but still susceptible to forms of corrorsion and wear. Thereafter, and referring to FIG. 2, a material 50 comprising of the above-discussed components (e.g., in parts by weight, less than about twenty percent (<20%) ethylene copolymer, less than about forty percent (<40%) epoxy, less than about thirty percent (<30%) epoxy-based resin, less than about two percent (<2%) blowing agent and from about one percent (1%) to about five percent (5%) curing agent (and optionally add any of the following components: less than about two percent (<2%) curing agent accelerator, from about twenty-five percent (25%) to fifty-five percent (55%) filler, and less than about one percent (<1%) of coloring agent) is placed in proximity of the space to be joined 40.

Figure 3:
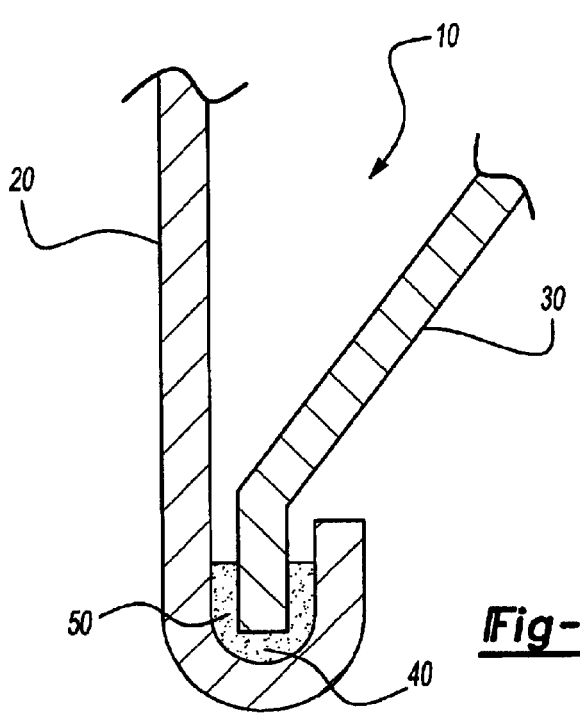
FIG. 3 shows the structural member illustrated in FIG. 2 after the material of the present invention has been exposed to a heat source, flowed and filled in the space to be joined.

Referring to FIG. 3, the material 50 is preferably, but not necessarily, exposed to a heat source (not shown), which may include ovens, equipment utilized in e-coat or paint operations, or other sources of heat energy such as a welding operation, UV-curing system, or other method of delivering heat energy, preferably at a temperature range between about 285° F. to about 400° F., and more preferably at about 340° F. for about 30 minutes, which allows the material 50 to flow, cover, and fill in the space to be reinforced or joined 40. The method of this present invention does not require the introduction of any additional adhesion material, mechanical fasteners, or pressurization in order to reinforce the structural member 10.

Figure 2:
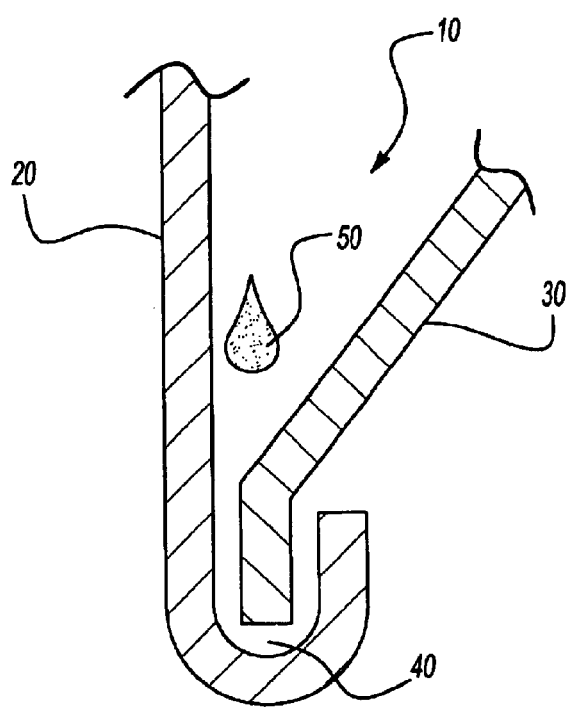
FIG. 2 shows the structural member illustrated in FIG. 1 with the material of the present invention placed in proximity of the space to be joined.

In a preferred embodiment of the present invention, the present invention may be utilized with a plurality of panels, which can serve to reduce, and potentially eliminate, the crimping process or step in the manufacturing environment. The material 50 in substantially rod-shaped is then placed in proximity to the hem flange area where structural reinforcement is desired as shown in FIG. 2. The placement of the material 50 can be conducted by sliding the rod-shaped material through a locating hole in a door of the automotive vehicle. The rod-shaped material, upon being exposed to a heating source (e.g., ovens) flows and cures in the hem flange area where structural reinforcement is desired as shown in FIG. 3. It should be noted that the material of the present invention can be made and/or molded into any geometric shape or thickness depending on the design parameter (e.g., the specific joint geometry) of the specific application chosen by one skilled in the art.

As one of ordinary skill in the art will appreciate, the present invention offers improved corrosion protection and structural integrity compared to prior art methods and processes for application of traditional hot melt materials used to reinforce hem flange joints because (1) unlike the standard application, the panels are cleaned, electrodeposition coated, and preferably baked or otherwise exposed to a heat source before the introduction of the material of the present invention, thus allowing (i) better removal of corrosion inducing contaminants such as metal shavings, oil, etc., and (ii) more consistent application of the material throughout the geometry of the selected joint, flange, or hinge; and (2) since the material is a thermoset hot melt, it does not flow upon re-heating like the traditional hot melt materials.

Accordingly, it is apparent that there has been provided in accordance with the invention a material, method, and application that fully satisfy the objects, aims and advantages set forth above. While the invention has been described in connection with specific embodiments thereof it is evident that many alternatives, modifications, and variations will be apparent to those skilled in the art in light of the foregoing description. Hence, the present invention is intended to embrace all such alternatives, modifications and variations that fall within the spirit and broad scope of the appended claims.

What is claimed is:

1. A method of reinforcing structural members comprising the steps of:
   providing a structural member of an automotive vehicle, the structural member having two substrates that form a hem flange, the hem flange forming a space to be joined;
   providing a material comprising of in parts by weight: less than about twenty percent (<20%) ethylene copolymer, less than about forty percent (<40%) epoxy, less than about thirty percent (<45%) epoxy-based resin, less than about two percent (<2%) blowing agent and from about one percent (1%) to about five percent (5%) curing agent;
   placing said material in proximity of said space to be joined;
   exposing said material to a heat source that delivers heat energy at a temperature between about 285° F. and about 400° F. causing said material to flow, fill, and cure in said space to be joined.

2. The method of claim 1, wherein said material is further comprised at least one component selected from the group consisting of in parts by weight: less than about two percent (<2%) curing agent accelerator; from about twenty-five percent (25%) to fifty-five percent (55%) filler; less than about one percent (<1%) coloring agent; and a combination thereof.

3. The method of claim 1, wherein said heat source exposes said material to a temperature of between about 285° F. to about 400° F.

4. The method of claim 2, wherein
   said two substrates are cleaned, electrodeposition coated, and exposed to a heat source to form said hem flange joint;
   said material is then placed in proximity of said space to be joined of said hem flange joint;
   said ethylene polymer is about 3.8 percent ethylene-methyl acrylate copolymer;
   said epoxy is about 23.49 percent bisphenol A epoxy;
   said epoxy resin is comprised of about 24.24 percent bisphenol A epoxy resin and about 0.26 percent epoxy phenol novoiac resin;
   said blowing agent is about 0.12 percent azodicarbonamide;
   said curing agent is about 1.55 percent cyanoguanidine;
   said curing agent accelerator is about 0.5 percent methylene diphenyl bis;
   said filler is about 45.84 percent calcium carbonate;
   said coloring agent is about 0.19 percent metal oxide; and
   said heat source exposes said material to a temperature of about 340° F. for about 30 minutes.

5. The method of claim 2, wherein
   said structural member having two substrates forming said space to be joined are a hem flange joint of an automobile, wherein said two substrates are cleaned, electrodeposition coated, and exposed to a heat source to form said hem flange joint;
   said material is then placed in proximity of said space to be joined of said hem flange joint;
   said ethylene polymer is about 3.8 percent ethylene-methyl acrylate copolymer;
   said epoxy is about 23.49 percent bisphenol A epoxy;
   said epoxy resin is comprised of about 24.24 percent bisphenol A epoxy resin and about 0.26 percent epoxy phenol novoiac resin;
   said blowing agent is about 0.12 percent azodicarbonamide;
   said curing agent is about 1.55 percent cyanoguanidine;
   said curing agent accelerator is about 0.5 percent methylene diphenyl bis;
   said filler is about 45.84 percent calcium carbonate;
   said coloring agent is about 0.19 percent metal oxide; and
   said heat source exposes said material to a temperature of about 340° F. for about 30 minutes.

6. The method of claim 2, wherein
   said hem flange is pre-crimped.

7. The method of claim 2, wherein
   said hem flange is crimped.

8. The material of claim 2, wherein said filler is selected from the group consisting of: calcium carbonate, mica, montmorillinite, aramide pulp, nanoclay, fumed silica, and a combination thereof.

9. The material of claim 1, wherein said epoxy is in a solid state and selected from a group consisting of: bisphenol A, bisphenol F, novolac, modified urethane, and a combination thereof.

10. A method of reinforcing structural members comprising the steps of:
    providing a structural member having two substrates forming a space to be joined, wherein;
    i) the two substrates include a first panel and a second panel of an automotive vehicle structure;
    ii) the first panel having an arcuate portion forming a cavity that defines at least a portion of the space to be joined and the second panel having an edge received in the cavity;
    providing a hot melt thermosettable material comprising an ethylene copolymer, an epoxy-based resin, less than about two percent blowing agent and from about one percent (1%) to about five percent (5%) curing agent;
    placing said material in proximity of said space to be joined;
    exposing said material to a heat source causing said material to flow, fill, and cure in said space to be joined.

11. The method of claim 10 wherein the two substrates are comprised of a first panel and a second panel.

12. The method claim 11 wherein the first panel and the second panel are part of an automotive vehicle structure selected from a tailgate, a lift gate, or a rear gate.

13. The method of claim 11 wherein the first panel and the second panel are joined to form a hem flange joint.

14. The method of claim 13 wherein providing the hot melt thermosettable material include mixing the material in an extruder.

15. The method of claim 13 wherein the joint is formed without crimping.

16. The method of claim 14 wherein the material contacts the arcuate portion of the first panel and the edge of the second panel.

17. The method of claim 10 wherein the material is thermoset by exposure to the heat source.

18. The method of claim 17 wherein the heat source is an oven employed in e-coat or painting operations applied to the automotive vehicle and the heat source exposes the material to a temperature of between about 285° F. to about 400° F.

19. The method of claim 10, wherein the material comprises, in parts by weight, less than about one percent (<1%) coloring agent wherein said coloring agent is a metal oxide.

20. The method of claim 10, wherein said ethylene polymer is in a solid state and selected from the group consisting of: ethylene-vinyl acrylate, ethylene-vinyl acetate, ethylene-methyl acrylate, ethylene-butyl acrylate, EMA/GMA, ethylene/α-olefin, ethylene-ethyl acrylate, and a combination thereof.

21. The method of claim 10, wherein said blowing agent is selected from the group consisting of azodiacarbonamide, p,p-Oxybisbenzene sulfonyl hydrazide, p-Toluene sulfonyl hydrazide, expancel, and a combination thereof.

22. The method of claim 10, wherein said curing agent is selected from the group consisting of cyanoguanidine, dicyanamide, imidazoles, and a combination thereof.

23. A method of reinforcing structural members comprising the steps of:

providing a structural member having two substrates forming a space to be joined wherein;

i) the two substrates include a first panel and a second panel of an automotive vehicle structure selected from a tailgate, a lift gate, or a rear gate;

ii) the first panel and the second panel form a particular hem flange joint having an arcuate portion forming a cavity that defines at least a portion of the space to be joined and the second panel having an edge received in the cavity;

providing a material comprising an ethylene copolymer, an epoxy-based resin, less than about two percent by weight blowing agent and from about one percent (1%) to about five percent (5%) by weight curing agent;

placing said material in proximity of said space to be joined, said material contacting the arcuate portion of the first panel and the edge of the second panel;

exposing said material to a heat source causing said material to flow, fill, and cure in said space to be joined wherein;

i) the material is thermoset by exposure to the heat source; and ii) the heat source is an oven employed in e-coat or painting operations applied to the automotive vehicle; and iii) the heat source exposes the material to a temperature of between about 285° F. to about 400° F.

24. The method of claim 23, wherein said ethylene polymer is in a solid state and selected from the group consisting of: ethylene-vinyl acrylate, ethylene-vinyl acetate, ethylene-methyl acrylate, ethylene-butyl acrylate, EMA/GMA, ethylene/α-olefin, ethylene-ethyl acrylate, and a combination thereof.

25. The method of claim 24, wherein the joint is formed without crimping.

* * * * *

UNITED STATES PATENT AND TRADEMARK OFFICE
CERTIFICATE OF CORRECTION

PATENT NO. : 6,887,914 B2
DATED : May 3, 2005
INVENTOR(S) : Czaplicki et al.

It is certified that error appears in the above-identified patent and that said Letters Patent is hereby corrected as shown below:

Title page,
Item [56], References Cited, OTHER PUBLICATIONS, replace
"U.S. Appl. No. 09/747,252 filed May 2, 2001." with
-- U.S. Appl. No. 09/847,252 filed May 2, 2001. --.

Signed and Sealed this

Twentieth Day of September, 2005

JON W. DUDAS
*Director of the United States Patent and Trademark Office*